United States Patent [19]

Deger et al.

[11] Patent Number: 4,766,207
[45] Date of Patent: Aug. 23, 1988

[54] PROCESS FOR THE PREPARATION OF WATER-SOLUBLE POLYSACCHARIDES, THE SACCHARIDES THUS OBTAINABLE, AND THEIR USE

[75] Inventors: Hans-Matthias Deger, Hofheim am Taunus, Fed. Rep. of Germany; Rüdiger Erckel, Coventry, R.I.; Raimund Franz, Kelkheim, Fed. Rep. of Germany; Wolfram Fritsche-Lang, Heppenheim, Fed. Rep. of Germany; Gert-Wolfhard von Rymon Lipinski, Frankfurt am Main, Fed. Rep. of Germany; Merten Schlingmann, Königstein, Fed. Rep. of Germany

[73] Assignee: Hoechst Aktiengesellschaft, Fed. Rep. of Germany

[21] Appl. No.: 748,934

[22] Filed: Jun. 26, 1985

[30] Foreign Application Priority Data

Jun. 26, 1984 [DE] Fed. Rep. of Germany ....... 3423421
Aug. 2, 1984 [DE] Fed. Rep. of Germany ....... 3428522

[51] Int. Cl.$^4$ ................ C08B 37/00; A23L 1/30; A23G 3/00; A21D 13/08
[52] U.S. Cl. ............... 536/18.6; 536/18.5; 536/124; 536/126; 426/658
[58] Field of Search ......... 536/18.5, 18.6, 121, 536/122, 124, 126

[56] References Cited

U.S. PATENT DOCUMENTS

| | | | |
|---|---|---|---|
| 2,355,245 | 8/1944 | Seyfarth et al. | 536/18.5 |
| 2,649,421 | 8/1950 | Stacey et al. | 536/126 |
| 3,346,558 | 10/1967 | Roth | 536/18.6 |
| 3,598,865 | 8/1971 | Lew | 536/18.6 |
| 3,766,165 | 10/1973 | Rennhard | |
| 3,876,794 | 4/1975 | Rennhard | |
| 4,024,290 | 5/1977 | Layton | 426/548 |
| 4,376,198 | 3/1983 | Dwivedi et al. | |

FOREIGN PATENT DOCUMENTS

| | | |
|---|---|---|
| 521340 | 3/1931 | Fed. Rep. of Germany . |
| 1173446 | 7/1964 | Fed. Rep. of Germany . |
| WO85/00814 | 2/1985 | PCT Int'l Appl. . |
| 1262842 | 2/1972 | United Kingdom . |
| 1418544 | 12/1975 | United Kingdom . |

OTHER PUBLICATIONS

H. J. Kinkel et al., Naturwissenschaften, 69, S. 241 (1982).
J. Defaye et al., Carbohydrate Research, 110, 217–227 (1982).
R. M. Layton et al., Food Product Development, 21, Issue 2, 53 (1978).
Synthetic Polysaccharides Using D-Glucose and 3,6 Anhydro-D-Glucose Residues, vol. 86, No. 5, Jan. 31, 1977, p. 391, abstract 86:30012y.
"Abstracts of Papers", American Chemical Society, 8/1981, Rennhard.

Primary Examiner—Ronald W. Griffin
Attorney, Agent, or Firm—Finnegan, Henderson Farabow, Garrett & Dunner

[57] ABSTRACT

Polysaccharides built up from anhydroglucose are obtained when glucose or carbohydrates containing glucose as the monomer structural unit are condensed with polyhydric alcohols in hydrogen fluoride. The products may be used as water binding agents and water retaining agents, especially for dietetic foodstuffs.

16 Claims, No Drawings

PROCESS FOR THE PREPARATION OF WATER-SOLUBLE POLYSACCHARIDES, THE SACCHARIDES THUS OBTAINABLE, AND THEIR USE

Oligomeric and polymeric saccharides of defined structure and of natural or microbiological origin are extensively used in industry as water-binding and water-retaining agents (cf, for example, Ullmanns Encyklopädie der technischen Chemi [Ullmann's Encyclopedia of Industrial Chemistry], 4th Edition, Volume 19, 1980, pages 233–263; N. L. Thomas and J. D. Birchall, Cem. Concr. Res. 13 (1983), 830–842).

British Pat. No. 1,262,842 discloses a process for the synthetic preparation of higher polysaccharides and polysaccharide derivatives of glucose and maltose by melt condensation of glucose or maltose, in which dry glucose or maltose or their hydrates or highly concentrated aqueous syrups are melted together with 5 to 20% by weight of a polyol acceptable in foodstuffs and up to 10 mol% of a low-volatility edible polycarboxylic acid which acts as the catalyst and crosslinking agent, under reduced pressure and at a temperature which is below the decomposition point of d-glucose or d-maltose, the water of condensation being removed at the same time. The added polyols in this reaction act as internal plasticizers. The products thus obtained, in which the monomer structural units are linked together in a random manner, are intended for use in diatetic foodstuffs. According to German Offenlegungsschrift No. 2,350,035, the condensation products have to be decolorized, for certain applications, by treatment with sorption agents or bleaching agents.

This known process has a number of disadvantages. The only suitable raw materials are glucose or maltose, which in turn are products of a chemical and/or enzymatic degradation of natural carbohydrates such as starch. These starting materials become re-polymerized during the melt condensation, which from a cost point of view is disadvantageous. The polyol must be acceptable in foodstuffs and the polycarboxylic acid must be edible, these being requirements which make the product more expensive, so that it becomes uneconomical for industrial purposes, especially in the foodstuff industry. Above all, residual polyol contents are often undesirable; for example, residual sorbitol is undesirable because of its laxative properties. Furthermore, the conditions of a melt condensation are difficult to control, so that there is a danger of caramelization or even decomposition of the product. Moreover, insoluble products can be formed, which are undesirable for numerous applications. The cause is that the polycarboxylic acid becomes incorporated into the product in an ester-like manner, leading to greater or lesser crosslinking of the molecule and hence to a reduction in solubility.

The value of using such water-insoluble polysaccharides as foodstuff additives, especially as ballast materials of low calorific value, is a disputed matter, since it is known that the materials enter the blood circulation through persorption and can cause thromboses (H. J. Kinkel, J. Gudjons and M. Plate, Naturwissenschaften 69 (1982), 241).

The presence of non-esterified carboxyl groups moreover gives the condensation product acidic properties, which are undesirable for certain applications, for example as diatetic additives.

We have now found that water-soluble polymeric saccharides which do not exhibit the abovementioned disadvantages can be obtained by a simple process, using cheap raw materials. Accordingly, the invention relates to a process for the preparation of water-soluble polysaccharides by reaction of aldoses or carbohydrates which are derived to the extent of at least 50 mol% from aldoses as monomer structural units, with an acid, and, if desired, at least one polyhydric alcohol, polyhydric alcohols being used additionally if glucose, or carbohydrates containing glucose as the sole monomer structural unit, are being reacted, which process comprises using hydrogen fluoride as the acid and, where appropriate, also as the solvent. In the preceding and subsequent text, the polyhydric alcohols are sometimes referred to as polyols and polyacetals, respectively, and the terms polymeric saccharides or polysaccharides are to be understood to mean products which for the greater part have a degree of polymerization of $\geq 2$.

Admittedly, it is known that glucose, when reacted with hydrogen fluoride, initially gives glucosyl fluoride, which, depending on its concentration, can polycondense with itself (cf. Defaye, Gadelle and Pedersen, Carbohydr. Res. 110 (1982), 217–227). However, it was to be expected that the polyalcohols which do not contain a glycoside carbon atom would act as reaction chain stoppers and hence hinder the polycondensation. On the other hand, as is known from the literature (R. M. Layton and J. C. Vlazny, Food Product Development 12 (1978) issue 2, 53; U.S. Pat. No. 4,376,198) exclusively glucosyl-sorbitol is formed from equivalent amounts of glucose and sorbitol under melt condensation conditions. Surprisingly, this is not the case to the same extent in the process of the present invention, even when higher proportions of polyalcohol are used. Even when using equivalent amounts of glucose and sorbitol, polysaccharides still constitute up to one-third of the product.

These polysaccharides obtainable in the presence of a polyalcohol, under the action of hydrogen fluoride, are novel and are therefore also a subject of the invention. The invention moreover relates to the use of the polysaccharides according to the invention as water-binding agents and water-retaining agents in the broader sense, especially in foodstuffs.

Especially if polyalcohols acceptable in foodstuffs are used for the preparation of the polysaccharides, the polysaccharides prepared according to the invention can be used as foodstuff additives of reduced calorific value, i.e. dietetic foodstuff constituents in various foodstuff preparations, for example in candies, chocolate blancmange, patisserie or gelatine-based desserts. In all the dishes and foodstuffs mentioned, they act as builders of low calorific value, and can proportionately be used, in respect of texture and structure, to replace, for example, flour or sucrose.

The polysaccharides according to the invention are degraded to only a minor extent by amylolytic enzymes such as α-amylase and amyloglucosidase as well as β-galactosidase.

As starting materials it is possible to employ, in addition to glucose, especially all other disaccharides, oligosaccharides or polysaccharides which are composed solely of glucose or anhydroglycose structural units, for example maltose, cellobiose, trehalose, isomaltose, gentiobiose, maltotriose, cellotriose etc. through cellulose, starch, glycogen and the like. It is also possible to employ, according to the invention, solid mixtures of monosaccharides, disaccharides or oligosaccharides, for example maltodextrins or cellodextrins (α- or β-1,4-glucans), such as are obtained from industrial processes. In addition to the commercially interesting cellulose and starch products of various origins, other glucans with correspondingly different type of linkage can be employed in the sense of the invention.

It is however also possible to convert, to water-soluble polysaccharides, those carbohydrates which in addition to anhydroglucose also contain other sugar monomer structural units or which are composed exclusively of monomer structural units different from anhydroglucose, provided these structural units consist to the extent of at least 50 mol% of aldoses. Accordingly, suitable starting materials, where appropriate alongside the above-mentioned compounds, are: monosaccharides such as galactose or mannose, oligosaccharides such as lactose, sucrose or raffinose, and polysaccharides such as guaran or other vegetable gums. The key substance of metabolism, namely glucose, is accordingly present in these process products to a lesser extent than in the products mentioned earlier, or not present at all, and this can, in the formation of randomly-linked polysaccharides, lead to products with further reduced digestibility. These products can be prepared with or without polyhydric alcohols.

Examples of polyhydric alcohols which can be employed according to the invention are ethylene glycol, the various propanediols, glycerol, erythritol, threitol, pentitols and hexitols such as ribitol, arabinitol, lyxitol, xylitol, sorbitol (glucitol), mannitol, galactitol, allitol, gulitol, iditol, altritol, talitol and, correspondingly, the stereoisomeric heptitols and octitols. However, other compounds with at least two hydroxyl groups can be used in the same sense. As examples there may be mentioned butane-1,4-diol, diethylene glycol, cyclohexane-1,2-diol, pentaerythritol, cyclitols and many others.

If polyhydric alcohols are present in the reaction, they are employed in amounts of not less than 0.01%, in general from 0.01 to 20%, preferably from 0.05 to 10%, especially from 0.1 to 5%, by weight based on starting material. Larger amounts can be used from the point of view of the process technology, but offer no advantages and can be disadvantageous for certain applications of the products. According to the invention it is therefore also possible to use very much lower amounts of polyol than in the process of British Pat. No. 1,262,842. At the same time, the polyalcohols are bonded in the form of their glycosides to the polysaccharides, and in particular the more completely, the lower the proportion added. In this respect such products differ in structure from those condensation products which are obtained without addition of a polyalcohol in hydrogen fluoride.

In the process according to the invention, the crude product obtained is a solution which in addition to hydrogen fluoride contains the water liberated during the condensation. To isolate the reaction product the hydrogen fluoride is removed—most simply by distillation—more or less completely, advantageously as far as possible. After the hydrogen fluoride has been distilled off, a colorless to pale gray homogeneous syrup remains, the aqueous solution of which requires no further purification and instead can be employed directly, where appropriate after neutralization.

The process according to the invention is advantageously carried out as follows:

(1) Preparation of a solution of one of the possible starting materials and of a polyhydric alcohol in liquid hydrogen fluoride, the saccharide being used in a concentration of 10 to 60% by weight, preferably 25 to 35% by weight, based on the solution, and the polyhydric alcohol being employed in an amount of 0.01-20%, preferably 0.05-10%, especially 0.1-5%, by weight, based on the starting material, i.e. the sum of aldose and carbohydrate, (2) maintenance of a reaction time (stirring time) of 5 minutes to 10 hours, preferably 30 minutes to 6 hours, especially 45 minutes to 1.5 hours, at temperatures of $-25°$ C. to $+120°$ C., preferably $10°$–$80°$ C., (3) distilling off of the hydrogen fluoride, where appropriate under reduced pressure, with or without a protective gas or carrier gas, the hydrogen fluoride being reused, (4) where required, dissolving the residual homogeneous colorless to pale gray syrup in water, removing the residual hydrogen fluoride present by treatment with suitable ion exchangers or neutralization with calcium hydroxide or calcium carbonate and filtering-off or centrifuging the calcium fluoride formed (which can, if desired, be passed to a hydrogen fluoride recovery stage), (5) where required, isolation of a solid from the solution (for example by freeze drying).

The yields of solids in the process according to the invention depend exclusively on the process technology details of working-up steps such as filtration or ion exchangers, which are known to a man skilled in the art. As a rule, the yields are in excess of 90% by weight, based on the starting material. The material prepared by the process described can be obtained, through use of freeze drying, as a colorless or pale yellowish powder. The product obtained in this form has the features of being devoid of intrinsic taste, being completely water-soluble, showing virtually no intrinsic color in solution and having a neutral pH.

By precipitation as insoluble calcium fluoride and/or by the use of effecrive ion exchangers it is possible to reduce the residual fluorine content in the product to a value of less than 20 ppm.

Compared to the prior art as described at the outset, the process of the invention has the following advantages: in comparison ith melt condensation, the use of liquid hydrogen fluoride as the reagent or catalyst and, where appropriate, as the solvent, permits maintaining low reaction temperatures and at the same time short reaction times. Caramelizations, often observed with carbohydrates, can in this way be avoided, and paler or colorless products are obtained. Basically, the process according to the invention gives completely water-soluble products because no crosslinking substances (such as, for example, citric acid, which can form triesters) need be used in carrying out the process. The process according to the invention permits using, in addition to glucose, other, and possibly cheaper, carbohydrates based on anhydroglucose or other sugar monomers, without process technology problems arising as a result of the properties of the corresponding substance.

A particular advantage of the process is that by excluding moisture or adding defined amounts of water the molecular weight distribution of the polysaccharides obtained can be influenced, in particular so as to give values of the DP (degree of polymerization) of from 1 to 100, corresponding to molecular weights of from 180 to 16,000, especially from 350 to 10,000.

The process of the invention thus makes it possible, by appropriate choice of the reaction conditions, especially of the moisture content, to prepare mixtures of water-soluble pale polysaccharides, derived from glucose, which have different mean chain lengths. The mean chain lengths can be estimated from, for example, the gel permeation chromatogram of the product.

The structure of the products prepared according to the invention can be investigated by chromatographic and spectroscopic methods. The bonding relationships, determined by methylation analyses (a literature review is given by S. Svensson, Angew. Chem. 82 (1970) 16, 643–652) are shown in Table 1 for the saccharides obtained from glucose, cellulose and starch respectively, in each case with 1% of sorbitol.

TABLE 1

Types of bonding in % (obtained by methylation analysis) as a function of the starting materials

| Starting materials | Glucose | Cellulose | Starch |
|---|---|---|---|
| linear content | 38–54 | 40–56 | 38–54 |
| branched content | 9–19 | 5–15 | 4–14 |
| end group content | 32–48 | 33–49 | 36–52 |
| 1,6- and 1,X,6-contents | 24–36 | 25–35 | 22–32 |

Table 1 shows that in the products according to the invention, which all contain the same monomer structural unit (glucose), comparable linkage patterns are found. At higher polyalcohol content, for example 10% of sorbitol, what is observed above all is an increase in the end group content to an average of 50%. The reducing end groups contained in the product can be determined by oxidation with dinitrosalicylic acid (cf. Helv. Chim. Acta 34 (1951) 2133–2139). As expected, a decrease in the proportion of reducing end groups is observed with increasing polyalcohol content.

The methylation analysis also shows a characteristic difference between the saccharides according to the invention and the saccharides, prepared by melt condensation, which are known from the literature. In the former, pyranoid structures are found exclusively, while in the latter 10% of the chain members and end members are furanoid structures. The furanoid structures can also be detected in the $^{13}$C-NMR spectrum.

Evaluation of the $^{13}$C-NMR spectra of the saccharides obtained according to the invention confirms the proportions, shown above, of the various glycoside bonds and additionally provides information concerning the configuration at the anomeric carbon atoms. From integration of the anomeric carbon signals, $\alpha/\beta$ ratios of 95:5 to 45:55, especially from 65:35 to 85:15, are estimated. In addition to the absence of a content of polycarboxylic acid radicals, this is a further feature differentiating from the polysaccharides prepared from glucose, a polyol and a polycarboxylic acid by melt condensation in accordance with the prior art. These latter products as a rule have an $\alpha/\beta$ ratio of less than 40:60.

The residual content of non-incorporated polyalcohol can be determined by use of high pressure liquid chromatography (HPLC) and is as a rule less than 10% of the amount of polyalcohol employed. Using the same method, it is also possible to analyze glucose as well as other monosaccharides, and also levoglucosan formed in traces.

The polyalcohol incorporated into the carbohydrate structure can be liberated again by acid hydrolysis of the products according to the invention and can be shown to be present, alongside glucose and/or the other monosaccharides, in the predetermined ratios.

A further differentiating feature is the specific rotation of the polysaccharides, determined in a polarimeter. In the products according to the invention it is as a rule above +100° (measured in a 10 percent strength solution in water), while with the products mentioned as known from the literature it is only about +60°.

The examples which follow explain the invention in more detail.

EXAMPLE 1

The reaction is carried out in a polytetrafluoroethylene (PTFE) distillation apparatus comprising a 650 ml round-bottomed flask, 50 cm column (without packing), distillation head, Liebig condenser (air cooling suffices), Vacuum adapter and 650 ml receiver (cooled to −60° C.).

128 g of anhydrous glucose and 1.28 g of sorbitol (1%, based on glucose) are added, with stirring, to the liquid hydrogen fluoride (300 g) which was initially introduced and precooled to 0° C., and the mixture is stirred for 1 hour at 20° C. (with a magnetic stirrer). The hydrogen fluoride is distilled off while warming to 50°–60° C. and stirring, with the vacuum slowly being increased, the main part of the hydrogen fluoride being removed under a full vacuum from a water pump. After 1.5–2.5 hours, about 90–95% of the hydrogen fluoride employed has been removed. About 145–160 g of a water-white syrup is obtained. The latter is taken up in 300 ml of water and neutralized with solid calcium carbonate, while stirring, the precipitated calcium fluoride is centrifuged off and the supernatant liquor is filtered, using a filter aid. The water-white solution is concentrated to a volume of about 200 ml and freeze-dried overnight. 108–115 g of a colorless, amorphous, only slightly hygroscopic powder (83.5–88.9% by weight) are obtained.

The content of reducing end groups is 5.2–8.5%. The specific optical rotation $[\alpha]_D^{20}$ (C=10, H$_2$O) is about 140°; according to HPLC analysis, 2.8–3.1% of glucose, 0.06–0.1% of sorbitol and 0.1–0.2% of levoglucosan are found.

EXAMPLE 2

Following the procedure described in Example 1, 82.5 g of cellulose (cellulose S, from Riedel de Haen) and 0.83 g of sorbitol are reacted in 250 ml of liquid hydrogen fluoride and the mixture is evaporated in a water pump vacuum to give a pale gray syrup. The same working up as in Example 1 gives 78 g of colorless saccharides (yield 93.0%).

Reducing end group content: 5.0%. $[\alpha]_D^{20}$ (C=10, H$_2$O)=+145.1°.

HPLC analysis: glucose 1.4%, sorbitol <0.1%, levoglucosan <0.2%.

EXAMPLE 3

800 g of dry liquid hydrogen fluoride are cooled to −27° C. in a cylindrical stainless steel stirred vessel and, while continuing the external cooling, a mixture of 400 g of starch and 4 g of sorbitol is introduced in such a way that the internal temperature reaches +23° C. The cooling is then removed and stirring is continued for 1 hour at an internal temperature of 7°–12° C. The cooling bath is then replaced by a water bath at +40° C., a brine-fed descending stainless steel condenser, terminating in a receiver cooled in solid carbon dioxide, is attached to the apparatus, and a vacuum which suffices for rapid distillation of the hydrogen fluoride is applied. This vacuum is progressively increased in order to maintain a high rate of distillation. In this way, 700 g of hydrogen fluoride are recovered in 2.5 hours. The residue in the reactor is dissolved in 1 liter of cold water, with stirring and moderarte cooling and the solution is rendered slightly alkaline with solid technical-grade calcium hydroxide and is neutralized by dropping solid carbon dioxide into it. The suspension thus obtained is suction-filtered through a bed of filter aid and the clear, only faintly colored, filtrate is freeze-dried. An almost colorless solid is obtained in a yield of 364 g (90%, based on the starch employed).

EXAMPLE 4

In the apparatus described in Example 1, 121.1 g of dry glucose and 13.5 g of sorbitol (weight ratio 9:1) are dissolved in 314 g of initially introduced hydrogen fluoride, this composition corresponding to a 30 percent strength solution of the components. After 1 hour's reaction at 25° C., the further procedure is as described in Example 1. After freeze-drying, a colorless powder is obtained in an amount of 121.5 g (90.3% by weight).

Reducing end group content: 7.1%. $[\alpha]_D^{20}$ (C=10, $H_2O$)=+112.5°.

HPLC analysis: glucose 2.8%, sorbitol 0.9%, levoglucosan 0.12%.

EXAMPLE 5

In the apparatus described in Example 1, 61.2 g of dry glucose and 0.6 g of glycerol (1% by weight) are dissolved in 144 g of liquid hydrogen fluoride initially introduced, this composition corresponding to a 30 percent strength solution of the components. After 1 hour's reaction at 25° C., the further procedure is as described in Example 1. After freeze-drying, a colorless powder is obtained in an amount of 57.95 g (93.8% by weight).

Reducing end group content: 19.4%. $[\alpha]_D^{20}$ (C=10, $H_2O$)=+114°.

HPLC analysis: glucose 9.2%, glycerol <0.1%, levoglucosan <0.2%.

EXAMPLE 6

In the apparatus described in Example 1, 75.8 g of dry glucose and 0.7 g of glycol (1% by weight) are reacted in 177 g of initially introduced liquid hydrogen fluoride. After 1 hour's reaction time at 25° C., the mixture is worked up as described in Example 1. After freeze-drying, 68.5 g of colorless saccharides (89.5% by weight) are obtained.

Reducing end group content: 13.9%. $[\alpha]_D^{20}$ (C=10, $H_2O$)=+127.3°.

HPLC analysis: glucose 4.0%, glycol <0.1%, levoglucosan <0.2%.

EXAMPLE 7

Following the procedure of Example 1, 118.8 g of starch (Riedel de Haen) and 13.2 g of sorbitol (weight ratio 9:1) are dissovled in 308 g of initially introduced liquid hydrogen fluoride and the mixture is kept at 25° C. for 1 hour. After working up as described in Example 1, and freeze-drying, 105.2 g of colorless product (79.7% by weight) are obtained.

Reducing end group content: 5.5%. $[\alpha]_D^{20}$ (C=10, $H_2O$)=107.9°.

HPLC analysis: glucose 2.3%, sorbitol 0.9%, levoglucosan 0.12%.

EXAMPLE 8

In the apparatus described in Example 1, 88.8 g of cellulose (cellulose S, Riedel de Haen), containing 20% of water, and 0.88 g of sorbitol are dissolved in 207 g of liquid hydrogen fluoride (giving a 30% strength solution of the components). After 1 hour, the mixture is worked up as described in Example 1. After freeze-drying, 64.4 g of colorless saccharides (89.5% by weight) are obtained.

Reducing end group content: 10.9%. $[\alpha]_D^{20}$ (C=10, $H_2O$)=+121.9°.

HPLC analysis: glucose 3.6%, sorbitol <0.1%, levoglucosan <0.2%.

EXAMPLE 9

In the apparatus described in Example 1, 87.0 g of glucose monohydrate and 0.88 g of sorbitol are dissolved in 205 g of initially introduced liquid hydrogen fluoride (giving a 30 percent strength solution of the components). After 2 hours at 35° C., the mixture is worked up by the following method, differing from Example 1: after the hydrogen fluoride has been distilled off in vacuo, the colorless syrup which remains is taken up in 300 ml of water, the mixture is stirred for half an hour with 550 g of moist basic anion exchanger (from MERCK, type I), which has beforehand been washed until neutral, the batch is filtered, the exchanger is washed with 2×100 ml of water and the filtrate is concentrated to one-third and freeze-dried: 72.2 g of colorless saccharides (92.3% by weight).

Reducing end group content: 12.3%. $[\alpha]_D^{20}$ (C=10, $H_2O$)=+117.4°.

HPLC analysis: glucose 3.9%, sorbitol <0.1%, levoglucosan <0.2%.

EXAMPLE 10

In the apparatus described in Example 1, 119.2 g of cellulose (cellulose S, Riedel de Haen) and 13.2 g of sorbitol (weight ratio 9:1) are dissolved in 309 g of initially introduced liquid hydrogen fluoride. After 1 hour at 25° C., the mixture is worked up as described in Example 1. 111.4 g (84.1% by weight) of a colorless powder are obtained.

Reducing end group content: 2.5%. $[\alpha]_D^{20}$ (C=10, $H_2O$)=+111.8°.

HPLC analysis: glucose 1.2%, sorbitol 0.9%, levoglucosan <0.2%.

EXAMPLE 11

In the apparatus described in Example 1, 41.4 g of dry glucose and 41.4 g of sorbitol are dissolved in 193 g of initially introduced liquid hydrogen fluoride. After a reaction time of 1 hour at 25° C., the procedure is continued as described in Example 1. 74.7 g of colorless saccharides (90.2% by weight) are obtained.

Reducing end group content: 0.7%. $[\alpha]_D^{20}$ (C=10, $H_2O$)=+56.7°.

HPLC analysis: glucose 1.75%, levoglucosan <0.2%, oligosaccharides/polysaccharides 23.9%, glucosylsorbitol 49.3%.

EXAMPLE 12

In the apparatus described in Example 1, 113.4 g of dry glucose and 12.6 g of xylitol (weight ratio 9:1) are dissolved in 294 g of initially introduced liquid hydrogen fluoride (to give a 30 percent strength solution of the components). After 1 hour's reaction at 25° C., the procedure is continued as described in Example 1. After freeze drying, 103.7 g (82.3% by weight) of colorless saccharides are obtained.

Reducing end group content: 6.5%. $[\alpha]_D^{20}$ (C=10, H$_2$O)= +102.6°.

HPLC analysis: glucose 1.7%, xylitol 1.0%, levoglucosan <0.2%.

EXAMPLE 13

In the apparatus described in Example 1, 130.3 g of dry glucose and 0.013 g of sorbitol (0.01% by weight) are dissolved in 304 g of initially introduced liquid hydrogen fluoride (to give a 30 percent strength solution of the components) and the solution is kept for 1 hour at 25° C. After working up as described in Example 1, and freeze-drying, 113.8 g of colorless saccharides (87.3% by weight) are obtained.

Reducing end group content: 8.7%. $[\alpha]_D^{20}$ (C=10, H$_2$O)= +122.5°.

HPLC analysis: glucose 2.4%, sorbitol -%, levoglucosan <0.2%.

DETECTION OF INCORPORATED POLYALCOHOL BY ACID TOTAL HYDROLYSIS

As typical of the other examples also, an acid total hydrolysis is carried out on the products obtained according to Examples 1, 4 and 7. In each case 5 g of the sample are dissolved in 100 ml of 1.5 percent strength sulfuric acid and the solution is kept in a glass autoclave at 135° C. for 2 hours. When it has cooled, the solution is neutralized with solid barium carbonate, the mixture is centrifuged and the supernatant liquor is freeze-dried.

| HPLC analysis | Glucose | Sorbitol | Residual polysaccharides |
|---|---|---|---|
| Example 1 | 96.2 | 0.9 | 2.4 |
| Example 4 | 89.5 | 9.7 | — |
| Example 7 | 85.9 | 9.5 | 4.1 |

Examples 14–17, which follow, describe the use of the polysaccharides according to the invention, prepared, for example, from glucose or starch and sorbitol, in dietetic foodstuffs. Conventional standardized methods of preparation can be used to prepare the recipe examples.

EXAMPLE 14

| Hard confectionery | |
|---|---|
| Constituents | Grams |
| Polysaccharides in powder form | 65.0 |
| Sucrose | 65.0 |
| Sodium citrate | 0.75 |
| Water | 34.55 |
| Citric acid, anhydrous | 2.0 |
| Lemon flavoring (Givaudan 61 318) | 0.5 |

The polysaccharides, sucrose and sodium citrate are added to the water and the mixture is heated, with stirring, until a solution formed; it is then briefly heated to 110°–115° C. and cooled until it thickens slightly. The viscous mixture is poured on to an oiled stone slab, sprinkled with citric acid and lemon flavoring, and compounded with these by kneading; the composition is then divided up into individual candies.

EXAMPLE 15

| Instant chocolate blancmange | |
|---|---|
| Constituents | Grams |
| Polysaccharides | 28.9 |
| Sucrose (as caster sugar) | 47.8 |
| Edible starch: Baka-Snack (Laing National) | 33.9 |
| Cocoa powder | 24.6 |
| Sodium chloride | 0.6 |
| Sodium pyrophosphate | 2.5 |
| Disodium hydrogen orthophosphate (anhydrous) | 4.6 |
| Vanilla flavoring (Firmenich No. 55,900/ AP 05.51) | 0.21 |
| Milk | 780 ml |

The dry constituents are mixed and stirred into the milk, and the composition is stirred by means of a hand mixer for 1 minute at speed-level 1 and then for 2 minutes at a higher speed level. The mixture is poured into bowls and chilled.

EXAMPLE 16

| Cookies | |
|---|---|
| Constituents | Grams |
| (Cookie) flour | 60.5 |
| Polysaccharides | 48.4 |
| Cellulose powder (Whatman CF 11) | 24.2 |
| Granulated sugar | 33.9 |
| Sodium chloride | 0.5 |
| Butter | 21.8 |
| Egg (from egg powder) | 24.2 |
| Vanilla sugar | 0.7 |
| Sodium bicarbonate | 0.7 |
| Water | 9.7 |

The sodium bicarbonate is dissolved in the water and the solution is stirred together with all other constituents in a Hobart mixer to give a dough (if necessary, add more water). The shapes are cut out of the dough and baked on a tray at 180° C. for 8–10 minutes.

EXAMPLE 17

| Sweet jelly | |
|---|---|
| Constituents | Grams |
| Polysaccharides | 20.0 |
| Sucrose | 20.0 |
| Sodium citrate | 0.27 |
| Citric acid | 1.10 |
| Gelatin (Croda 160 Bloom) | 7.0 |
| Lemon flavoring (IFF 17.41.0195) | 0.31 |
| Colorant BBA powder (H 7461) | 0.2 |
| Water | 200.0 |

All the constituents are dissolved in hot water, with stirring, and the solution is then poured into prepared molds and is chilled.

ENZYMATIC DEGRADABILITY

The enzymatic degradability of the products according to the invention is investigated, using a simple experimental arrangement (Table 2). A 3 percent strength solution of the product to be investigated is treated with α-amylase/amyloglucosidase under conditions known from the literature. In each case at the start of the measurement and after 6 hours a glucose determination is carried out (using, as standards, potato starch and a commercially available melt condensate of glucose/sorbitol).

TABLE 2

Enzymatic degradation experiments on the products according to the invention

| Example | Glucose concentration in % | |
|---|---|---|
| | enzymatic determination (HPLC) starting value | enzymatic determination after enzyme treatment |
| 1 | 2.7 (2.8–3.1) | 13.8 |
| 2 | 1.3 (1.4) | 8.1 |
| 3 | 2.7 | 13.0 |
| 4 | 2.2 (2.8) | 13.4 |
| 7 | 1.8 (2.3) | 15.0 |
| 8 | 3.7 (3.6) | 12.6 |
| 10 | 0.8 (1.2) | 12.3 |
| 11 | 0.9 (1.75) | 8.7 |
| 12 | 2.2 (1.7) | 9.9 |
| 13 | 2.4 (2.4) | 10.3 |
| Potato starch | 0.01 | 76.0 |
| Melt condensate | 3.9 | 12.5 |

EXAMPLE 18

400 g of dry liquid hydrogen fluoride were cooled to −25° C. in a cylindrical stainless steel stirred kettle and, while continuing the external cooling, a mixture of 200 g of D-(+)-galactose and 2 g of sorbitol was introduced in such a way that the internal temperature reached +0° C. The cooling was then removed and stirring was continued for 1 hour at an internal temperature of +5° to +12° C. The cooling bath was then replaced by a water bath at +40° C., a brine-fed descending stainless steel condenser terminating in a receiver cooled in solid carbon dioxide was attached to the apparatus, and a vacuum sufficient for rapid distillation of the hydrogen fluoride was applied. This vacuum was increased progressively in order to maintain a high rate of distillation. In this way, 550 g of hydrogen fluoride were recovered in one hour. The residue in the reactor was dissolved in 1 liter of cold water, with stirring and moderate cooling, after 30 minutes the solution was rendered slightly alkaline with solid technical-grade calcium hydroxide, and after a further 30 minutes it was neutralized by dropping solid carbon dioxide into it. The suspension thus obtained was suction-filtered through a bed of filter aid and the clear, only slightly colored filtrate was freeze-dried. An almost colorless solid was obtained in a yield of 182 g (90% based on galactose employed).

Reducing end group content: 5.9%. $[\alpha]_D^{20}$ (c=10, $H_2O$)= +167.1°.

EXAMPLE 19

The reaction is carried out in a 650 ml polytetrafluoroethylene vacuum distillation apparatus. 115 g of anhydrous mannose and 12.9 g of sorbitol (10%, based on starting material) are added, with stirring, to the liquid hydrogen fluoride (300 g) which has been initially introduced and precooled to 0° C., and the mixture is stirred for 1 hour a 20° C., using a magnetic stirrer. The hydrogen fluoride is distilled off while warming the mixture to 50°–60° C. and stirring, with the vacuum slowly being increased, the main part being distilled off under the full vacuum of a water pump. After 1.5–2.5 hours, about 90–95% of the hydrogen fluoride employed have been removed. About 150–160 g of a water-white syrup are obtained. The latter is taken up in 30 ml of water, the solution is neutralized with solid calcium carbonate, while stirring, the precipitated calcium fluoride is centrifuged off and the supernatant liquor is filtered, using a filter aid. The water-white solution is concentrated to a volume of about 200 ml and is freeze-dried overnight. 104 g of colorless, amorphous, only slightly hygroscopic powder (81.3% by weight) are obtained.

Reducing end group content: 3.6%. $[\alpha]_D^{20}$ (c=10, $H_2O$)=46.1°.

EXAMPLES 20 TO 27

Using the procedure described in Example 18, various monosaccharides and disaccharides are reacted in liquid hydrogen fluoride. The individual data are shown in Table 3.

TABLE 3

Data on experiments with various carbohydrates

| Example | Starting material | Amount used, g | Polyalcohol sorbitol, g | Amount of HF g | Product yield, g | % of starting material | Reducing end group content % | $[\alpha]_D^{20}$ (c = 10, $H_2O$) |
|---|---|---|---|---|---|---|---|---|
| 20 | D-mannose | 200 | 2 | 400 | 172 | 85 | 2.4 | +62.2° |
| 21 | D-lactose | 200 | 2 | 400 | 182 | 90 | 6.1 | +142.9° |
| 22 | Guaran (Meyproguar) CSAA M-225 | 200 | 2 | 400 | 182 | 90 | 9.7 | +88.2° |
| 23 | D-sucrose | 200 | 2 | 400 | 186 | 92 | 3.7 | +28.8° |
| 24 | D-lactose | 118 | 6.2 | 290 | 96 | 77 | 4.8 | +133.0° |
| 25 | D-sucrose | 110 | 12.3 | 290 | 106 | 87 | 6.9 | +27.6° |
| 26 | D-galactose | 118.5 | 6.2 | 290 | 94 | 75 | 5.2 | +141.8° |
| 27 | D-galactose | 136 | — | 320 | 99 | 73 | 4.6 | +164.0° |

EXAMPLE 28

As a measure of the enzymatic in vivo degradability of the products according to the invention, the behavior toward the enzymes, occurring in the body, amylase/amyloglucosidase (treatment A) and β-galactosidase (treatment B) are tested in vitro (cf. P. Präve et al., Handbuch der Biotechnologie (Handbook of Biotechnology), Akadem. Verlagsanstalt, Wiesbaden 1982, page 403 et seq., as well as Methoden der enzymatischen Lebensmittelanalytik (Methods of Enzymatic Foodstuff Analysis), Boehringer Mannheim 1983). In each case enzymatic monosaccharide determinations of glucose or galactose are carried out at the start of the measurement and after 6 hours or 1 hour (literature, cf. above; the standards used are potato starch and a melt condensate known from the literature—cf. British Pat. No. 1,262,842—or lactose). The results of the monosaccharide determinations are shown in Table 4.

TABLE 4

In vitro degradation of the products according to the invention by amylase/amyloglucosidase (A) or β-galactosidase (B) treatment

| Example (educt) | A: Glucose concentration in % | | B: Galactose concentration in % | |
|---|---|---|---|---|
| | Initial value | Final value | Initial value | Final value |
| 18 (Gal) | — | — | 1.50 | 1.98 |
| 21 (Lac) | 0.6 | 2.7 | 0.44 | 0.92 |
| 22 (Guaran) | — | — | 0.95 | 1.08 |
| 23 (Sac) | 0.3 | 8.0 | — | — |
| 24 (Lac) | 0.88 | 3.62 | 0.75 | 0.74 |
| 25 (Sac) | 1.56 | 8.27 | — | — |
| 26 (Gal) | — | — | 2.51 | 2.93 |
| 27 (Gal) | — | — | 2.04 | 2.10 |
| Potato starch | 0.01 | 76.0 | — | — |
| Melt condensate | 3.9 | 12.5 | — | — |
| Lactose | — | — | 0 | 99.4 |

We claim:

1. A process for the manufacture of water-soluble polysaccharides, which comprises reacting at a temperature in the range from −25° to +120° C. an aldose or a carbohydrate derived to the extent of at least 50 mol-% from an aldose as monomer structural unit with hydrogen fluoride in addition to a polyhydric alcohol and evaporating the hydrogen fluoride at the end of the reaction.

2. A process according to claim 1, wherein the reaction is carried out in the presence of 0.01 to 20% of a polyhydric alcohol, referred to the weight of the sum of the aldose and carbohydrate.

3. A process according to claim 2, wherein the reaction is carried out in the presence of 0.05 to 10% of the polyhydric alcohol.

4. A process according to claim 2, wherein the reaction is carried out in the presence of 0.1 to 5% of the polyhydric alcohol.

5. A process according to claim 1, wherein the temperature is in the range from +10° to 80° C.

6. A process according to claim 1, wherein the total amount of the aldose and the carbohydrate is present in the solution in hydrogen fluoride in a concentration in the range from 10 to 60% by weight of the solution.

7. A process according to claim 6, wherein the concentration is in the range from 25 to 35%.

8. Water-soluble polysaccharides obtained according to the process of claim 2.

9. A water-soluble polysaccharide according to claim 1, wherein the content of the groups of the polyhydric alcohol is in the range from 0.1 to 20% of the saccharide body to which it is attached.

10. A polysaccharide according to claim 9, wherein the range is from 0.1 to 5%.

11. A water-binding agent or water-retention agent comprising a polysaccharide according to claim 8.

12. A food comprising a polysaccharide according to claim 8.

13. A process according to claim 1, wherein the aldose, carbohydrate or polysaccharide respectively is completely derived from glucose.

14. A process for the manufacture of water-soluble polysaccharides, which comprises reacting at a temperature in the range from −25° to +80° C. an aldose or a carbohydrate derived to the extent of at least 50 mol-% from an aldose as monomer structural unit with hydrogen fluoride in addition to 0.01 to 20% of a polyhydric alcohol and evaporating the hydrogen fluoride at the end of the reaction, the percentage data being referred to the weight of the sum of the aldose and carbohydrate.

15. A process according to claim 14, wherein the total amount of the aldose and the carbohydrate is present in the solution in hydrogen fluoride in a concentration in the range from 10 to 60% by weight of the solution.

16. A process for the manufacture of water-soluble polysaccharides, which comprises reacting at a temperature in the range from −25° to +120° C. an aldose or a carbohydrate derived to the extent of at least 50 mol-% from an aldose as monomer structural unit with hydrogen fluoride in addition to 0.1 to 20% of a polyhydric alcohol and evaporating the hydrogen fluoride at the end of the reaction, the percentage data being referred to the weight of the sum of the aldose and carbohydrate.

* * * * *